(12) United States Patent
Ressler et al.

(10) Patent No.: US 11,264,815 B2
(45) Date of Patent: Mar. 1, 2022

(54) CONTROL OF THERMAL RUNAWAY EVENT IN BATTERY SYSTEM

(71) Applicant: GM GLOBAL TECHNOLOGY OPERATIONS LLC, Detroit, MI (US)

(72) Inventors: Galen E. Ressler, White Lake, MI (US); Calvin Goodman, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 16/677,056

(22) Filed: Nov. 7, 2019

(65) Prior Publication Data

US 2021/0143652 A1  May 13, 2021

(51) Int. Cl.
*H02J 7/00* (2006.01)
*H01M 10/42* (2006.01)

(52) U.S. Cl.
CPC ....... *H02J 7/0031* (2013.01); *H01M 10/4257* (2013.01); *H02J 7/0025* (2020.01); *H02J 7/00309* (2020.01); *H02J 7/007194* (2020.01)

(58) Field of Classification Search
USPC .......................................... 320/134, 153–154
See application file for complete search history.

(56) References Cited

U.S. PATENT DOCUMENTS

| | | | | |
|---|---|---|---|---|
| 2011/0298626 | A1* | 12/2011 | Fechalos | H02J 7/0029 340/664 |
| 2014/0025215 | A1* | 1/2014 | Carlson | H02J 7/35 700/292 |
| 2015/0214757 | A1* | 7/2015 | Zane | H02J 7/0021 320/107 |
| 2016/0204484 | A1* | 7/2016 | Haensgen | B60L 1/02 320/107 |

* cited by examiner

*Primary Examiner* — Samuel Berhanu
(74) *Attorney, Agent, or Firm* — Quinn IP Law

(57) ABSTRACT

A method of controlling a thermal runaway event in a battery system having first and second battery modules. The method includes detecting a thermal runaway event in the first battery module, and, in response to the detection of the thermal runaway event, determining whether an electrical current is flowing through the first battery module. The method also includes electrically decoupling the first battery module from the second battery module in response to the detection of the thermal runaway event, if the current is not flowing through the first battery module. Furthermore, the method includes electrically connecting the second battery module to an electrical load to discharge the second module through the load, if the current is determined to be flowing through the first battery module or after decoupling the first module. Discharging the second battery module is intended to control propagation of the thermal runaway event through the second module.

20 Claims, 6 Drawing Sheets

CONTROL OF THERMAL RUNAWAY EVENT IN BATTERY SYSTEM

INTRODUCTION

The present disclosure relates to a system and a method for controlling a thermal runaway event in a battery system.

A battery system or array may include a plurality of battery cells in relatively close proximity to one another. Batteries may be broadly classified into primary and secondary batteries. Primary batteries, also referred to as disposable batteries, are intended to be used until depleted, after which they are simply replaced with new batteries. Secondary batteries, more commonly referred to as rechargeable batteries, employ specific chemistries permitting such batteries to be repeatedly recharged and reused, therefore offering economic, environmental and ease-of-use benefits compared to disposable batteries.

Rechargeable batteries may be used to power such diverse items as toys, consumer electronics, and motor vehicles. Particular chemistries of rechargeable batteries, such as lithium-ion cells, as well as external factors, may cause internal reaction rates generating significant amounts of thermal energy. Such chemical reactions may cause more heat to be generated by the batteries than is effectively withdrawn. Exposure of a battery cell to elevated temperatures over prolonged periods may cause the cell to experience a thermal runaway event. Accordingly, a thermal runaway event starting within an individual cell may lead to the heat spreading to adjacent cells and cause the thermal runaway event to affect the entire battery array.

SUMMARY

A method of controlling a thermal runaway event in a battery system, which includes a first battery module and a second battery module. The method includes detecting, via a sensor, a thermal runaway event in the first battery module. The method also includes communicating a signal indicative of the detected thermal runaway event to an electronic controller. The method additionally includes determining, via the electronic controller, in response to the signal, whether an electrical current is flowing through the first battery module. The method also includes electrically decoupling the first battery module from the second battery module, via the electronic controller, in response to the signal, if the electrical current is not flowing through the first battery module. Furthermore, the method includes electrically connecting the second battery module to an electrical load to discharge the second battery module through the electrical load, if the electrical current is determined to be flowing through the first battery module or after decoupling the first battery module. Discharging the second battery module thusly is intended to control propagation of the thermal runaway event through the second battery module.

Electrically decoupling the first battery module from the second battery module may include closing, via the electronic controller, a first electrical circuit.

Closing the first electrical circuit may include closing a first switch.

Electrically connecting the second battery module to the electrical load may include closing, via the electronic controller, a second electrical circuit.

Closing the second electrical circuit may include opening a second switch.

The first battery module may include a plurality of first battery cells and the second battery module may include a plurality of second battery cells.

Discharging the second battery module through the electrical load may include discharging the second battery module to 50% of charge.

The load may be a high-voltage heater or a pre-charge resistor.

The sensor may include at least one of a temperature sensor configured to detect a temperature of the first battery module, a voltage sensor configured to detect a voltage drop in the first battery module, a pressure sensor configured to detect a pressure increase in the first battery module, and a gas detection sensor to detect presence of a gas in the first battery module.

The electrical load may include a first electrical resistance device and a second electrical resistance device. The first battery module may be connected to the first electrical resistance device via a first electrical circuit and the second battery module may be connected to the second electrical resistance device via a second electrical circuit.

A battery system employing an electronic controller to perform the above-disclosed method is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
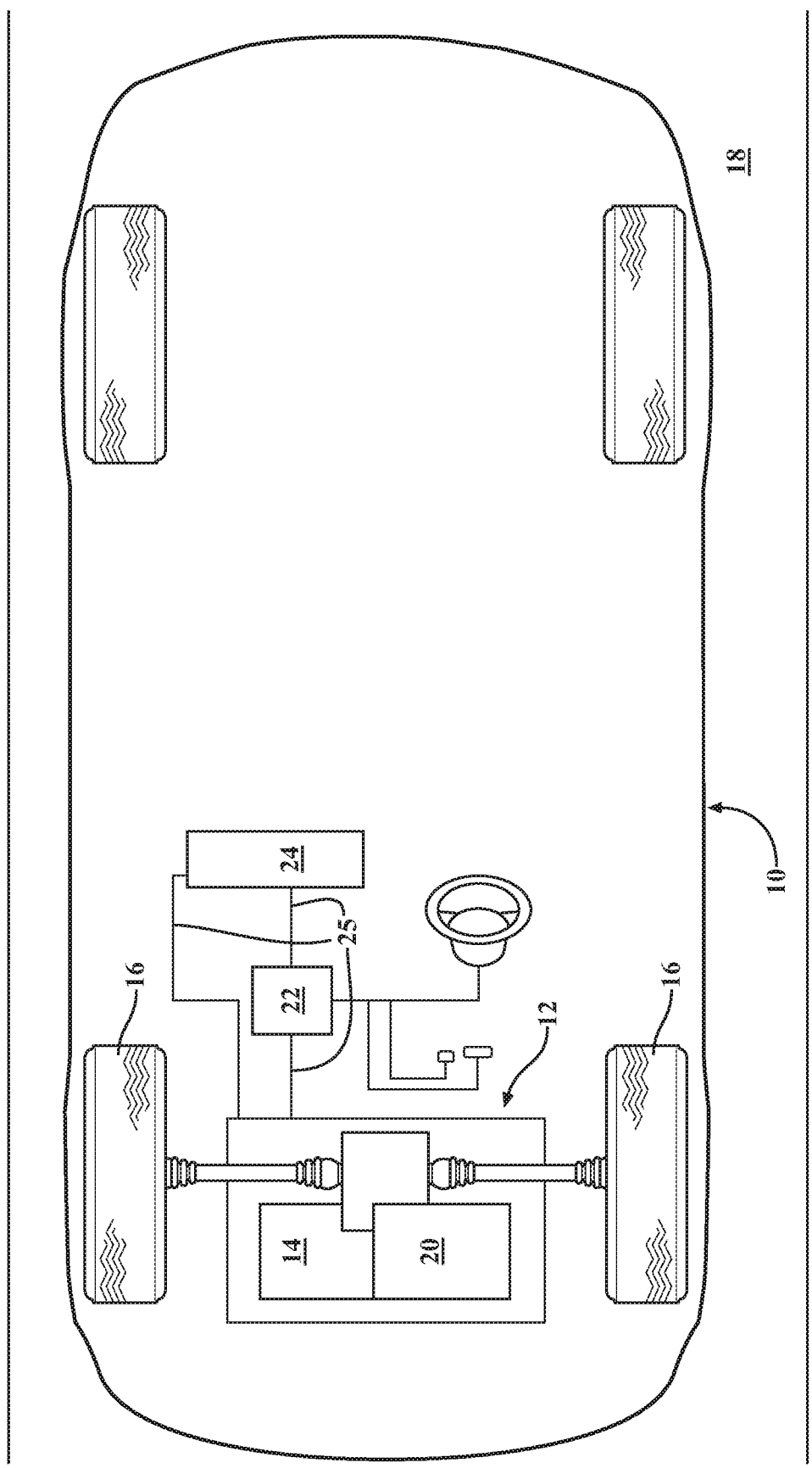
FIG. 1 is a schematic top view of an embodiment of a motor vehicle employing a hybrid powertrain with multiple power-sources, and a battery system configured to generate and store electrical energy for supplying the electrical energy to the power-sources, according to the disclosure.
Figure 2:
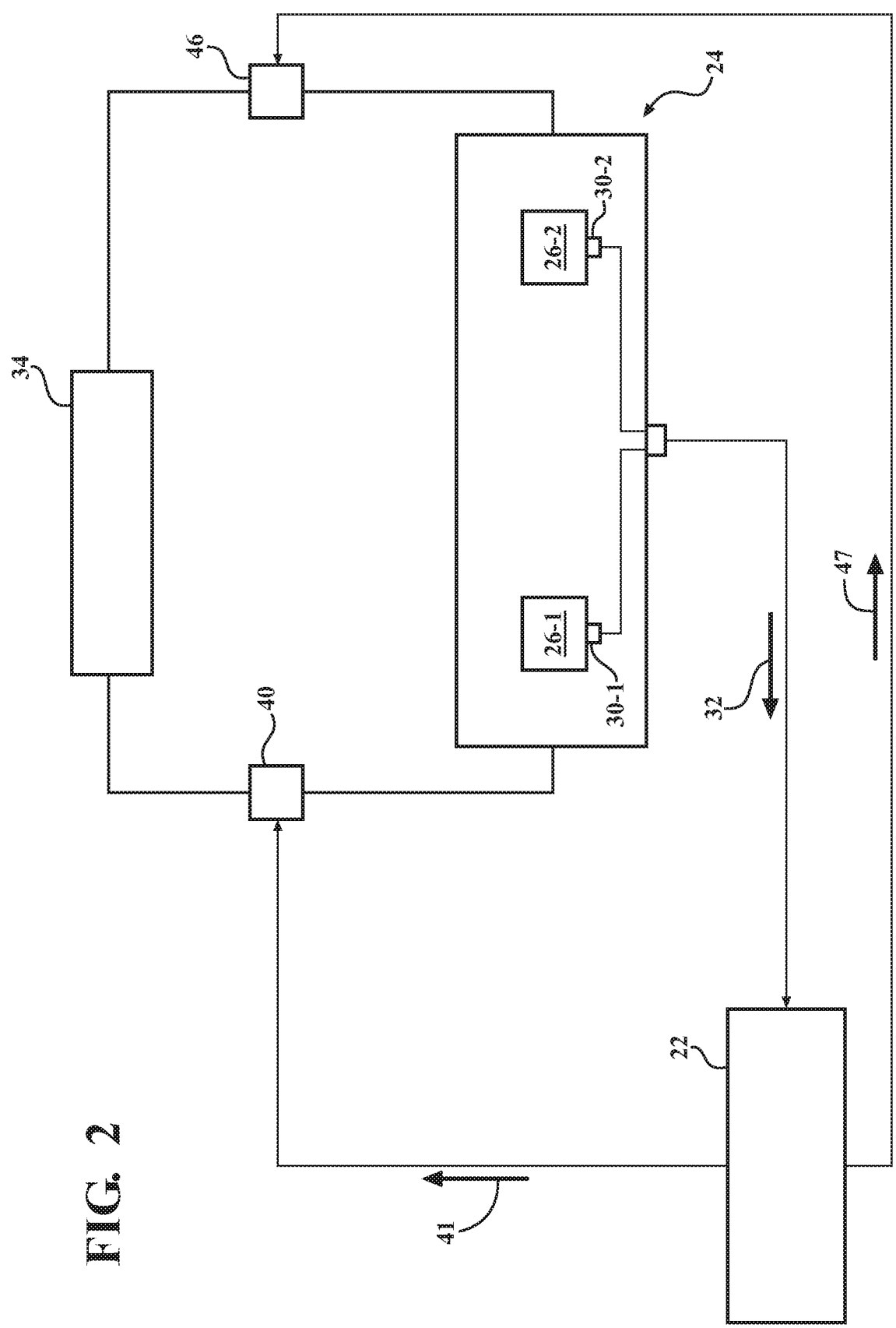
FIG. 2 is a circuit diagram of the battery system shown in FIG. 1, according to the disclosure.

Referring to FIG. 1, a motor vehicle 10 having a powertrain 12 is depicted. The vehicle 10 may include, but not be limited to, a commercial vehicle, industrial vehicle, passenger vehicle, aircraft, watercraft, train or the like. It is also contemplated that the vehicle 10 may be a mobile platform, such as an airplane, all-terrain vehicle (ATV), boat, personal movement apparatus, robot and the like to accomplish the purposes of this disclosure. The powertrain 12 includes a power-source 14 configured to generate a power-source torque T (shown in FIG. 1) for propulsion of the vehicle 10 via driven wheels 16 relative to a road surface 18. The power-source 14 is depicted as an electric motor-generator.

As shown in FIG. 1, the powertrain 12 may also include an additional power-source 20, such as an internal combustion engine. The power-sources 14 and 20 may act in concert to power the vehicle 10. The vehicle 10 additionally includes a programmable electronic controller 22 and a battery system 24 configured to generate and store electrical energy through heat-producing electro-chemical reactions for supplying the electrical energy to the power-sources 14 and 20. The electronic controller 22 may be programmed to control the powertrain 12 and the battery system 24 to generate a predetermined amount of power-source torque T, and various other vehicle systems. The electronic controller 22 may include a central processing unit (CPU) that regulates various functions on the vehicle 10, or be configured as a powertrain control module (PCM) configured to control the powertrain 12. In either of the above configurations, the electronic controller 22 includes a processor and tangible, non-transitory memory, which includes instructions for operation of the powertrain 12 and the battery system 24 programmed therein. The memory may be an appropriate recordable medium that participates in providing computer-readable data or process instructions. Such a recordable medium may take many forms, including but not limited to non-volatile media and volatile media.

Non-volatile media for the electronic controller 22 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer, or via a wireless connection. Memory of the electronic controller 22 may also include a flexible disk, hard disk, magnetic tape, another magnetic medium, a CD-ROM, DVD, another optical medium, etc. The electronic controller 22 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 22 or accessible thereby may be stored in the memory and automatically executed to provide the required functionality of the powertrain 12 and the battery system 24.

Figure 3:
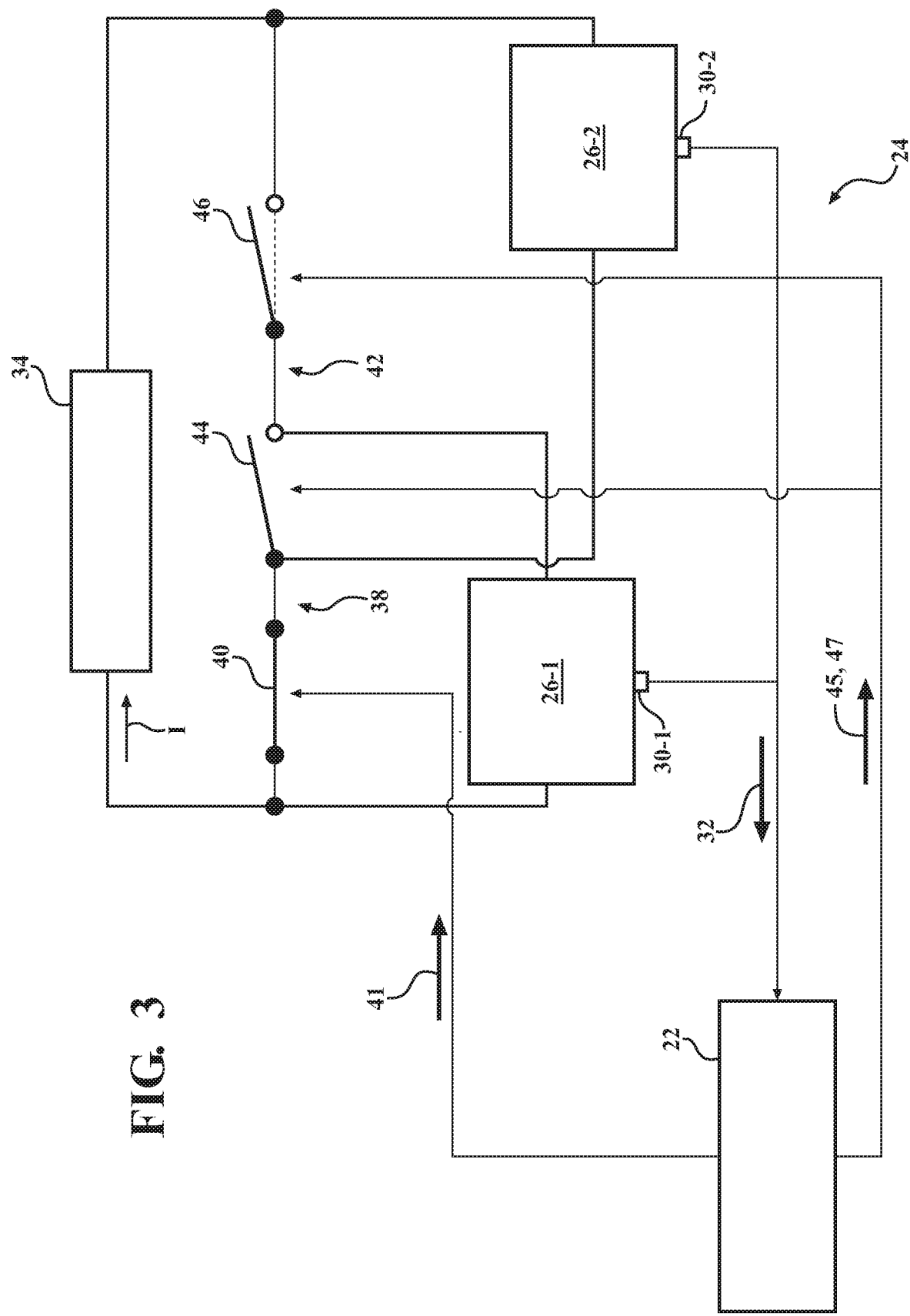
FIG. 3 is a circuit diagram of the battery system shown in FIG. 2, depicting a plurality of battery modules connected to an electrical discharge load, according to the disclosure.
Figure 4:
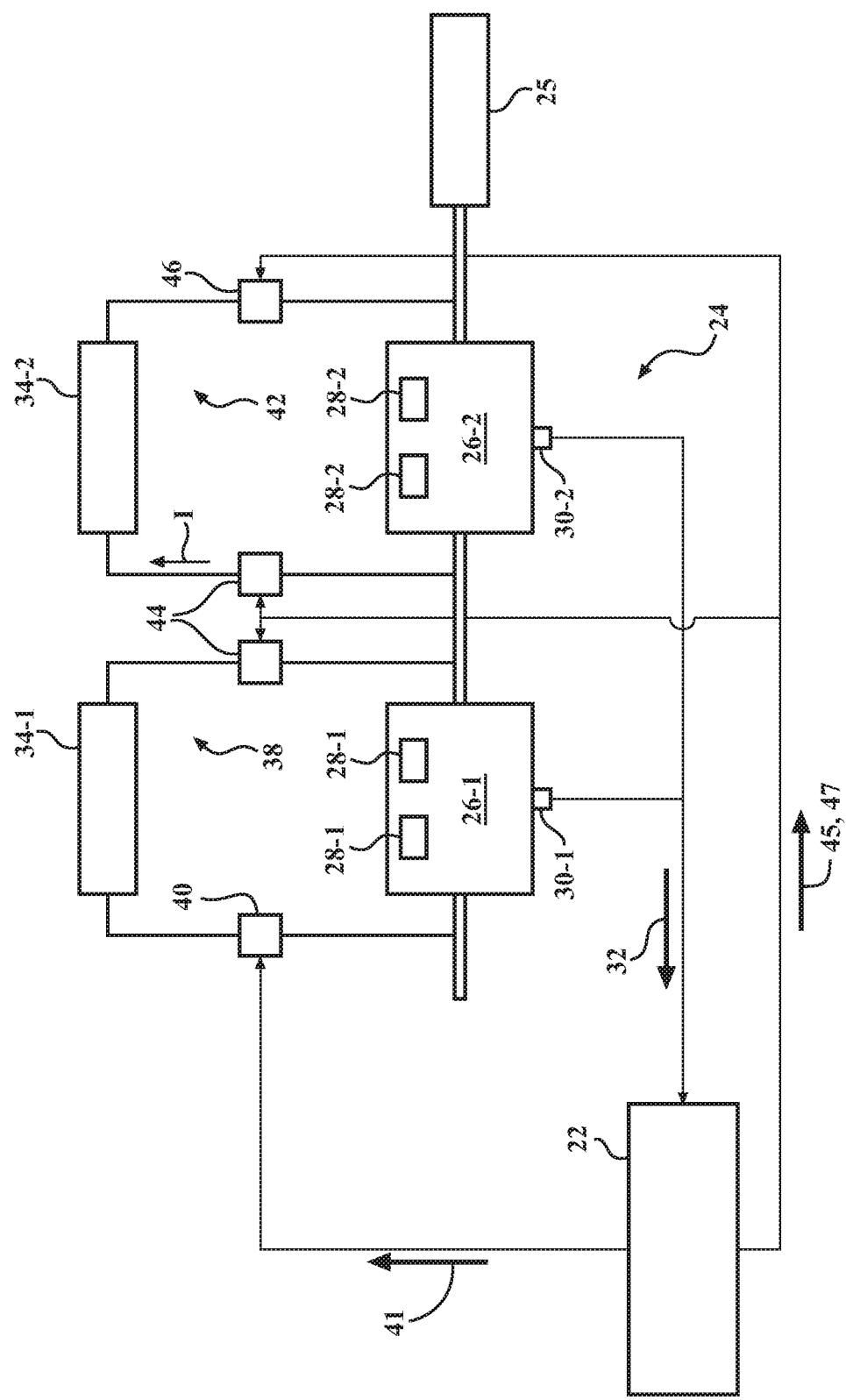
FIG. 4 is a circuit diagram of the battery system shown in FIG. 2, depicting a plurality of battery modules, wherein each module is connected to an individual electrical discharge load, according to the disclosure.

The battery system 24 may be connected to the power-sources 14 and 20, the electronic controller 22, as well as other vehicle systems via a high-voltage BUS 25. As shown in FIGS. 2-5, the battery system 24 may include a plurality of battery modules or sections, such as a module 26-1 and a module 26-2. Although two modules 26-1, 26-2 are shown, nothing precludes the battery system 24 from having a greater number of such battery modules. As shown in FIG. 4, the first battery module 26-1 may include one or more of first battery cells or cell arrays 28-1, and the second battery module 26-2 may similarly include one or more of second battery cells or cell arrays 28-2. Operation of the powertrain 12 and the battery system 24 may generally be regulated by the electronic controller 22.

As shown in FIGS. 2-5, the battery system 24 includes sensors, such as sensors 30-1 and 30-2, configured to detect a thermal runaway event affecting individual battery modules, such as in the respective first module 26-1 and second module 26-2. The term "thermal runaway event" refers to an uncontrolled increase in temperature in a battery system. During a thermal runaway event, the generation of heat within a battery system or a battery cell exceeds the dissipation of heat, thus leading to a further increase in temperature. A thermal runaway event may be triggered by various conditions, including a short circuit within the cell, improper cell use, physical abuse, manufacturing defects, or exposure of the cell to extreme external temperatures. Each of the subject sensors 30-1, 30-2 is also configured to generate a signal 32 indicative of the detected thermal runaway event in the corresponding first and second battery modules 26-1, 26-2. Although two sensors 30-1 and 30-2 are shown, nothing precludes the battery system 24 from having a greater number of such sensors, each corresponding to a specific battery module extant therein, or a plurality of sensors per module. For simplicity, however, the present disclosure will concentrate on description of the battery system 24 specifically having two modules 26-1, 26-2 and two corresponding sensors 30-1, 30-2.

Generally, the duration of time between battery cells in thermal runaway in a pack may vary from 30 seconds to greater than 3 minutes, depending on cell and pack design. Testing has shown that a reduction in a state of charge (SOC) may increase this duration by as much as a factor of 5 for an SOC reduction of 15%. A reduction in SOC may reduce measured peak cell surface temperatures by as much as 200-300 degrees Celsius for an SOC reduction of 10%. Thus, any reduction in SOC prior to a cell entering thermal runaway is beneficial to increase the amount of time for the cell to reach critical temperature and/or reduce the cell's heat output. In baseline situations, the time (t) to reduce the SOC of the next cell is generally between 0.5 and 3 minutes, and is n*t to reduce the SOC of the $n^{th}$ cell. For pack-level discharge, normal current limits may be used for discharge the cells. Current levels may be varied relative to discharge duration (the longer the duration, the lower the current).

The electronic controller 22 is programmed to receive the signal(s) 32 from sensor 30-1 and/or sensor 30-2. Each of the sensors 30-1 and 30-2 may be either a temperature sensor configured to detect a temperature of the respective first and second battery modules 26-1, 26-2, a voltage sensor configured to detect a voltage drop in the first battery module 26-2, a pressure sensor configured to detect a pressure increase in the first battery module, or a gas detection sensor to detect presence of a gas in the first battery module. The electronic controller 22 is also programmed to determine, in response to the signal 32, whether an electrical current I is flowing through the battery module experiencing and being damaged by the thermal runaway event. For simplicity, the present disclosure will concentrate on description of a situation where the first battery module 26-1 undergoes a thermal runaway event.

A thermal runaway event in either the first battery module 26-1 or the second battery module 26-2 may cause the corresponding battery module to generate an amount of internal gas sufficient to maintain a flow of the electrical current I through the subject battery module. In the case of the present example where the first battery module 26-1 undergoes a thermal runaway event, the electronic controller 22 is also programmed to electrically decouple the first battery module 26-1 from the second battery module 26-2 in response to the signal 32, if it is determined that the electrical current I is not flowing through the first battery module. The decoupling of the first battery module 26-1 from the second battery module 26-2 effectively permits the current I to bypass the damaged first battery module 26-1 when the damaged battery module is no longer capable of passing the current.

The electronic controller 22 is also programmed to connect the second battery module 26-2 to an electrical discharge load 34, to thereby discharge the second battery module through the electrical discharge load. If an insufficient amount of the electrical current I is determined to be flowing through the first battery module 26-1, the first battery module will have to be disconnected from the circuit connecting the second battery module 26-2 to the discharge load 34. However, if thermal runaway event in either the first battery module 26-1 or the second battery module 26-2 generates the internal gas permitting a flow of the electrical current I through the subject battery module, a bypass of the damage module may not be required. Accordingly, the electronic controller 22 may be used to determine whether the electrical current I continues to flow through the damaged first battery module 26-1, and, if so, the first battery module may be permitted to remain part of the circuit connecting the second battery module 26-2 to the discharge load 34. Additionally, the electronic controller 22 is programmed to connect the second battery module 26-2 to the discharge load 34, to thereby discharge the second battery module through the load, if the electrical current I is determined to be flowing through the first battery module 26-1, when sufficient internal gas is generated by the first battery module or after the first battery module has been decoupled. If the electrical current I is still flowing through the first battery module 26-1, the first battery module will then be discharged through the load 34 along with the second battery module 26-2.

Figure 5:
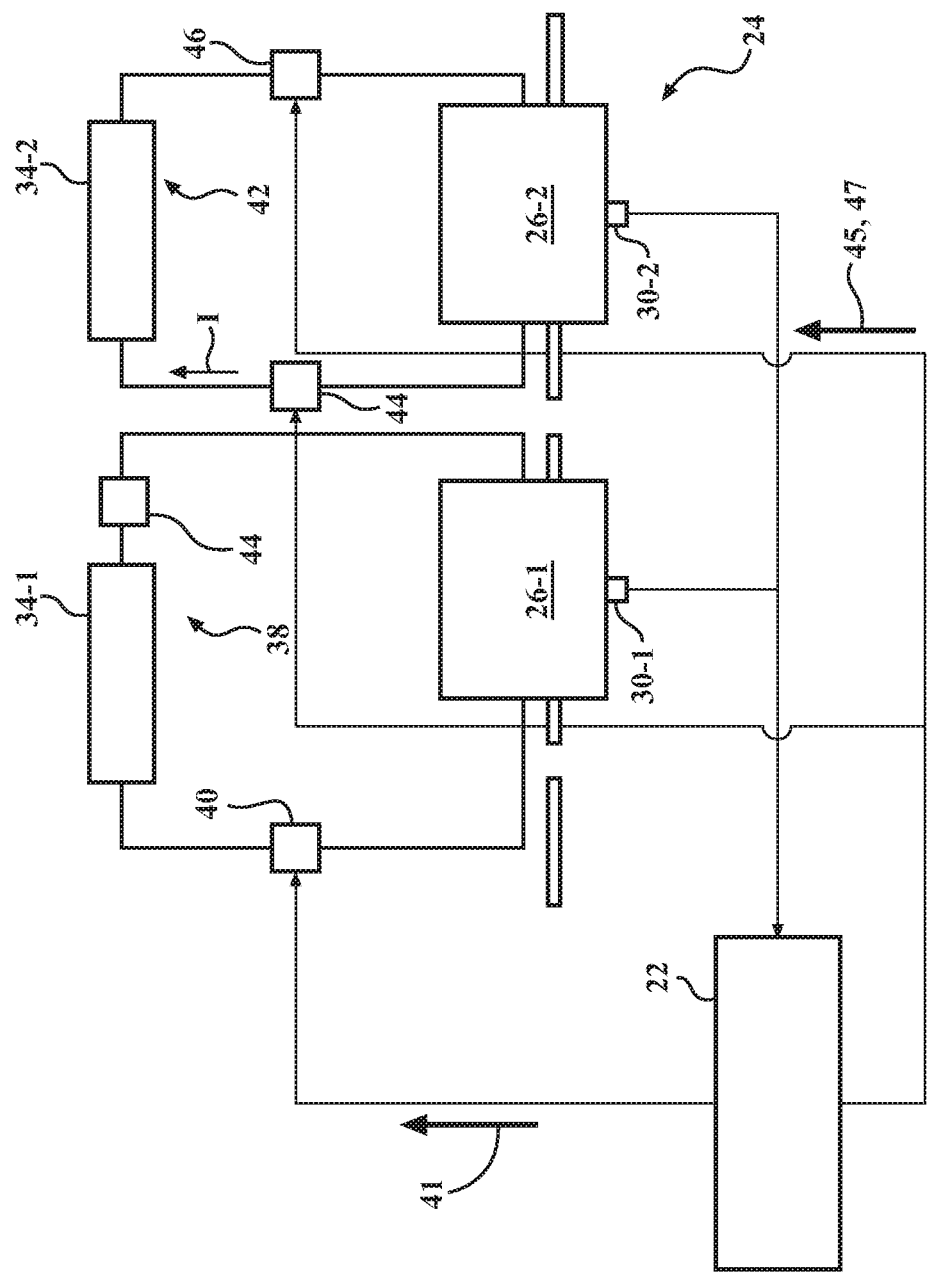
FIG. 5 is a circuit diagram of another embodiment of the battery system shown in FIG. 4, according to the disclosure.

As shown in FIGS. 4 and 5, the discharge load 34 may include a first electrical resistance device 34-1 and a second electrical resistance device 34-2. In such an embodiment, the first battery module 26-1 may be separately connected to the first electrical resistance device 34-1 via a first electrical circuit 38 and the second battery module 26-2 may be connected to the second electrical resistance device 34-2 via a second electrical circuit 42. Overall, discharging of the second battery module 26-2 through the discharge load 34 is intended to control propagation of the thermal runaway event through the second battery module 26-2 and minimize duration and severity of the subject event within the battery system 24.

The electronic controller 22 may be configured to electrically decouple the first battery module 26-1 from the second battery module 26-2 via closing the first electrical circuit 38. As shown in FIG. 3, the electronic controller 22 may be configured to close the first electrical circuit 38 by commanding a first switch 40 to close via a signal 41. Although, generally, resistances already exist within batteries, a dedicated discharge load or resistance may be implemented to control the discharge of the second battery module 26-2. Accordingly, the electronic controller 22 may also be configured to connect the second battery module 26-2 to the discharge load 34 via closing the second electrical circuit 42. The discharge load 34 may be a high-voltage heater or a pre-charge resistance arranged as part of the first electrical circuit 38. As shown in FIG. 3, the electronic controller 22 may be configured to close the second electrical circuit 42 via commanding a second switch 44 to open via a signal 45. Optionally, as shown in FIG. 3, the electronic controller 22 may be also configured to close the first electrical circuit 38 via closing the first switch 40 via the signal 41 and closing a third switch 46 via a signal 47. In general, the electronic controller 22 may be specifically programmed to discharge the second battery module 26-2 through the discharge load 34 to 50% of charge, which may be deemed sufficient to stem propagation of the thermal runaway event through the second battery module, or less, if conditions permit.

Figure 6:
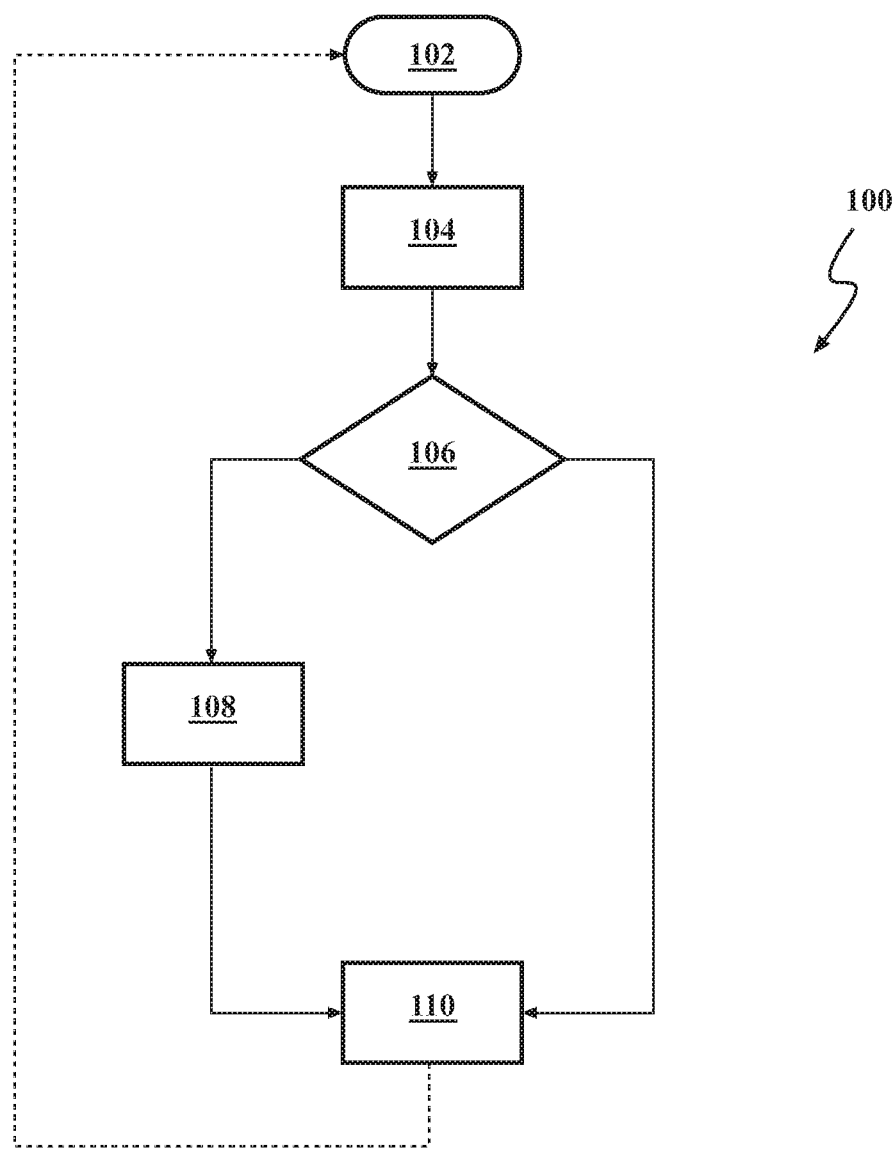
FIG. 6 illustrates a method of controlling a thermal runaway event in the battery system shown in FIGS. 1-5.

A method 100 of controlling a thermal runaway event in the battery system 24 is shown in FIG. 6, and described below with reference to the structure shown in FIGS. 1-5. Method 100 commences in frame 102 with detecting, via the sensor 30-1 or sensor 30-2, a thermal runaway event in the respective first battery module 26-1 or second battery module 26-2. As with respect to FIGS. 1-5, although a thermal runaway event may take place in one or more battery modules of the battery system 24, the present disclosure of the method 100 will concentrate on the description of a situation where the first battery module 26-1 undergoes such a detected thermal runaway event. Following frame 102, the method advances to frame 104. In frame 104, the method includes communicating the signal 32 indicative of the detected thermal runaway event to the electronic controller 22.

From frame 104, the method moves on to frame 106, where the method includes determining, via the electronic controller 22, in response to the signal 32, whether the electrical current I is flowing through the first battery module 26-1. As discussed above with respect to FIGS. 1-5, the thermal runaway event in the first battery module 26-1 may be indicative of the first battery module having generated internal gas maintaining a flow of the electrical current I through the first battery module. Thus, determining whether the electrical current I is flowing through the first battery module may be used to decide whether the first battery module needs to be decoupled from the circuit connecting the second battery module 26-2 to the discharge load 34. Therefore, if the electrical current I is determined to still be flowing through the first battery module 26-1, after frame 106 the method may proceed directly to frame 110.

Alternatively, after frame 106 the method may proceed to frame 108, where the method includes electrically decoupling the first battery module 26-1 from the second battery module 26-2, via the electronic controller 22, in response to the signal 32, if the electrical current I is determined to not be flowing through the first battery module. As described with respect to FIGS. 1-5, electrically decoupling the first battery module 26-1 from the second battery module 26-2 may include closing a first electrical circuit via the first switch 40, and optionally via the third switch 46. Following frame 108, the method may proceed to frame 110. In frame 110 the method includes electrically connecting the second battery module 26-2 to the electrical discharge load 34 to discharge the second battery module through the discharge load 34, if the electrical current I is determined to be flowing through the first battery module 26-1 or after decoupling the first battery module. If the electrical current I is determined to be flowing through the first battery module 26-1, the first battery module will then be discharged along with the second battery module 26-2.

As additionally described with respect to FIGS. 1-5, electrically connecting the second battery module 26-2 to the discharge load 34 may include closing the second electrical circuit 42 via opening the second switch 44. It is envisioned that discharging of the second battery module 26-2 through the discharge load 34 will control propagation of the thermal runaway event through the second battery module 26-2 and minimize duration and severity of the thermal runaway event within the battery system 24. Following frame 110 the method may loop back to frame 102 for another control cycle of detecting an indication of a thermal runaway event in the battery system 24.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method of controlling a thermal runaway event in a battery system having a first battery module and a second battery module, the method comprising:
   detecting, via a sensor, a thermal runaway event in the first battery module;
   communicating a signal indicative of the detected thermal runaway event to an electronic controller;
   determining, via the electronic controller, in response to the signal, whether an electrical current is flowing through the first battery module;
   electrically decoupling the first battery module from the second battery module, via the electronic controller, in response to the signal, if the electrical current is not flowing through the first battery module; and
   electrically connecting the second battery module to an electrical load to discharge the second battery module through the electrical load, if the electrical current is determined to be flowing through the first battery module or after decoupling the first battery module, and thereby controlling propagation of the thermal runaway event through the second battery module.

2. The method of claim 1, wherein electrically decoupling the first battery module from the second battery module includes closing, via the electronic controller, a first electrical circuit.

3. The method of claim 2, wherein closing the first electrical circuit includes closing a first switch.

4. The method of claim 1, wherein electrically connecting the second battery module to the electrical load includes closing, via the electronic controller, a second electrical circuit.

5. The method of claim 4, wherein closing the second electrical circuit includes opening a second switch.

6. The method of claim 1, wherein the first battery module includes a plurality of first battery cells and the second battery module includes a plurality of second battery cells.

7. The method of claim 1, wherein discharging the second battery module through the electrical load includes discharging the second battery module to 50% of charge.

8. The method of claim 1, wherein the load is a high-voltage heater or a pre-charge resistance.

9. The method of claim 1, wherein the sensor includes at least one of a temperature sensor configured to detect a temperature of the first battery module, a voltage sensor configured to detect a voltage drop in the first battery module, a pressure sensor configured to detect a pressure increase in the first battery module, and a gas detection sensor to detect presence of a gas in the first battery module.

10. The method of claim 1, wherein the electrical load includes a first electrical resistance device and a second electrical resistance device, and wherein the first battery module is connected to the first electrical resistance device via a first electrical circuit and the second battery module is connected to the second electrical resistance device via a second electrical circuit.

11. A battery system comprising:
   a first battery module and a second battery module;
   a sensor configured to detect a thermal runaway event in the first battery module and generate a signal indicative of the detected thermal runaway event; and
   an electronic controller programmed to:
      receive the signal from the sensor;
      determine, in response to the signal, whether an electrical current is flowing through the first battery module;
      electrically decouple the first battery module from the second battery module, in response to the signal, if the electrical current is not flowing through the first battery module; and
      electrically connect the second battery module to an electrical load to discharge the second battery module through the electrical load, if the electrical current is determined to be flowing through the first battery module or after decoupling the first battery module, and thereby control propagation of the thermal runaway event through the second battery module.

12. The battery system of claim 11, wherein the electronic controller is configured to electrically decouple the first battery module from the second battery module via closing a first electrical circuit.

13. The battery system of claim 12, wherein the electronic controller is configured to close the first electrical circuit via closing a first switch.

14. The battery system of claim 11, wherein the electronic controller is configured to electrically connect the second battery module to the electrical load via closing a second electrical circuit.

15. The battery system of claim 14, wherein the electronic controller is configured to close the second electrical circuit via opening a second switch.

16. The battery system of claim 11, wherein the first battery module includes a plurality of first battery cells and the second battery module includes a plurality of second battery cells.

17. The battery system of claim 11, wherein the electronic controller is further programmed to discharge the second battery module through the electrical load to 50% of charge.

18. The battery system of claim 11, wherein the load is a high-voltage heater or a pre-charge resistance.

19. The battery system of claim 11, wherein the sensor includes at least one of a temperature sensor configured to detect a temperature of the first battery module, a voltage sensor configured to detect a voltage drop in the first battery module, a pressure sensor configured to detect a pressure increase in the first battery module, and a gas detection sensor to detect presence of a gas in the first battery module.

20. The battery system of claim 11, wherein the electrical load includes a first electrical resistance device and a second electrical resistance device, and wherein the first battery module is connected to the first electrical resistance device via a first electrical circuit and the second battery module is connected to the second electrical resistance device via a second electrical circuit.

* * * * *